United States Patent

Batscha

[15] 3,677,012

[45] July 18, 1972

[54] COMPOSITE CYCLE TURBOMACHINERY

[72] Inventor: Alexander P. Batscha, Cincinnati, Ohio
[73] Assignee: General Electric Company
[22] Filed: May 31, 1962
[21] Appl. No.: 199,191

[52] U.S. Cl. .................................................60/262, 60/263
[51] Int. Cl. .........................................................F02k 1/02
[58] Field of Search...................60/35.6 U, 35.6 W, 35.6 V, 60/35.6 CC, 39.16, 262, 263; 230/116 A, 116 B

[56] References Cited

UNITED STATES PATENTS

| | | | |
|---|---|---|---|
| 2,650,666 | 9/1953 | Dorand et al. | 60/39.17 |
| 2,929,203 | 3/1960 | Henning et al. | 60/35.6 U |
| 3,016,698 | 1/1962 | Sobey | 60/39.17 |
| 2,887,845 | 5/1959 | Hagen | 60/35.6 U |
| 2,989,843 | 6/1961 | Ferri | 60/35.6 U |

FOREIGN PATENTS OR APPLICATIONS

| | | | |
|---|---|---|---|
| 1,081,277 | 5/1960 | Germany | 60/35.6 U |

*Primary Examiner*—Samuel Feinberg
*Attorney*—Oscar B. Waddell, G. R. Powers, E. S. Lee, III, Derek P. Lawrence, Frank L. Neuhauser and Melvin M. Goldenberg

EXEMPLARY CLAIM

1. A composite fluid flow turbomachine comprising:
   a first compressor;
   a second compressor, said second compressor being arranged to continuously receive a part only of the flow from said first compressor,
   an inner duct surrounding said second compressor;
   an outer duct surrounding said first compressor and said inner duct;
   means for injecting fuel within said outer duct and said inner duct for supporting combustion therein downstream of said first compressor and said second compressor, respectively;
   a first power turbine located in said inner duct and receiving an integral fluid flow stream from said first and second compressors;
   a second power turbine located partially in said outer duct, said second power turbine receiving a fluid flow stream from said first compressor and the integral fluid flow stream from said first and second compressors;
   an outer driveshaft, said first power turbine and said second compressor being mounted on said outer driveshaft for rotation therewith;
   an inner driveshaft concentric to said outer driveshaft, said second power turbine and said first compressor being mounted on said inner driveshaft for rotation therewith;
   and a power transfer turbine, said power transfer turbine being arranged in series flow relation with said first and second power turbines, said power transfer turbine being mounted on said inner driveshaft and furnishing power to help drive said first compressor, whereby the overall cycle efficiency of said composite fluid flow turbomachine is increased.

7 Claims, 7 Drawing Figures

INVENTOR.
ALEXANDER P. BATSCHA
BY
Harry C. Burgess
ATTORNEY

COMPOSITE CYCLE TURBOMACHINERY

The present invention relates generally to turbomachinery and, more specifically, to an arrangement of turbomachinery which acts as a turbofan at subsonic flight conditions and as a turbojet at supersonic flight conditions.

A well-known type of turbomachine is an aircraft gas turbine engine including a duct having an air inlet at one end and an opening at the other end for the exit of exhaust gases. In such an engine air enters the duct, is compressed by a rotating compressor, heated in a combustion chamber, and expanded through a turbine wheel. The power output of the turbine wheel drives the compressor rotor, which is mounted on the same driveshaft, or any mechanical load connected to the driveshaft. A turbojet may therefore be defined simply as a gas turbine in which no excess energy (above that required to drive the compressor and any accessories) is supplied by the turbine (wheel) and the available energy in the exhaust gases supplies the jet thrust. On the other hand, in a turbofan, which includes a low pressure compressor or fan, located in an auxiliary duct arranged annularly about the primary duct, or in a turboprop engine, the turbine does provide excess energy over that needed to drive the compressor rotor. The excess energy is used to drive a propeller, in the turboprop, and the fan, or low pressure compressor, in the turbofan.

Any given propulsion cycle will usually prefer a high turbine inlet temperature at low pressure ratios, where pressure ratio is defined as the ratio of the pressure at the inlet end of the duct to that at the discharge end of the compressor, in order to obtain a high value of net thrust without augmentation or afterburning. For low net thrust values, on the other hand, the preferred cycle will have a low turbine inlet temperature with a high pressure ratio. However, pressure ratio is proportional to the square root of the turbine inlet temperature and directly proportional to the weight of airflow through the compressor. Therefore, in a conventional turbomachine propulsion cycle a low thrust value at which both the weight of airflow and the turbine inlet temperature are low results in a very low cycle pressure ratio and, hence, a less efficient machine.

It is also known that generally for aircraft flight missions at greater than sonic speeds a turbojet engine with high turbine inlet temperature gives better performance, whereas at speeds less than sonic the turbofan engine is preferably in terms of performance. It would seem advantageous, therefore, to combine the advantages of each engine in a single machine having a propulsion cycle wherein the machine has "turbojet" characteristics at Mach 3.0 and above, and, with the aid of a suitable bypass arrangement, "turbofan" characteristics at less than Mach 1.0. I have determined that it is possible to design a "convertible" or "composite" cycle machine which will provide a lighter machine with a higher pressure ratio compressor and, moreover, a machine that will burn less fuel per hour per pound of thrust, thus having a lower "specific fuel consumption" (SFC), which is an indication of better efficiency.

Thus, a general object of the present invention is to provide a convertible turbomachine which combines improved performance at flight speeds of Mach 3.0, and beyond, and at subsonic flight speeds.

A more specific object is to provide a convertible turbomachine which will operate more efficiently at off-design points and without discontinuity between subsonic flight speeds and flight speeds of Mach 3.0 and above.

It is also an object of the invention to provide a turbomachine having a composite, or convertible, propulsion cycle wherein a single unit operates as a "turbojet" at high Mach flight speeds and as a modified "turbofan" at speeds below Mach 1.0.

Briefly, in one embodiment of my invention I provide a composite cycle turbomachine including a first compressor, a second compressor continuously receiving part of the flow from the first compressor, first and second duct means, the first duct means surrounding the compressors and the second duct means, means for injecting fuel into each of the duct means for sustaining combustion therein, a first turbine drivingly connected to the second compressor and a second turbine drivingly connected to the first compressor, the second turbine receiving a first fluid flow stream directly from the first compressor and a second integrated or combined flow stream from the first and second compressors. The invention further includes power transfer turbine in series flow relation with the first and second turbines and one of the duct means, the power transfer turbine acting to increase the overall cycle efficiency in either the "turbojet" operating mode, or the "turbofan" operating mode.

While the specification concludes with claims particularly pointing out and distinctly claiming the subject matter of the present invention, it is believed that the invention will be better understood, and other advantages and objects thereof become more apparent, from the following detailed description read in conjunction with the accompanying drawings in which:

Figure 1A:
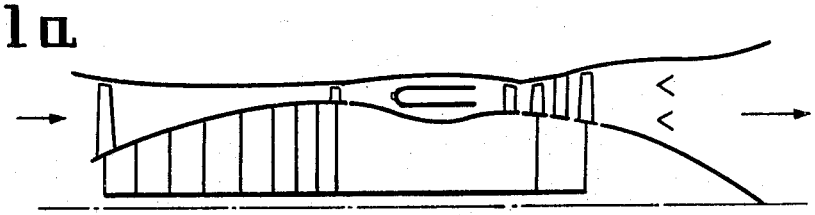
FIGS. 1a–1c are schematic side views taken parallel to the axis of several turbomachines comprising, respectively, a conventional turbojet, a conventional turbofan, and a machine having a composite cycle as described herein.
Figure 1B:
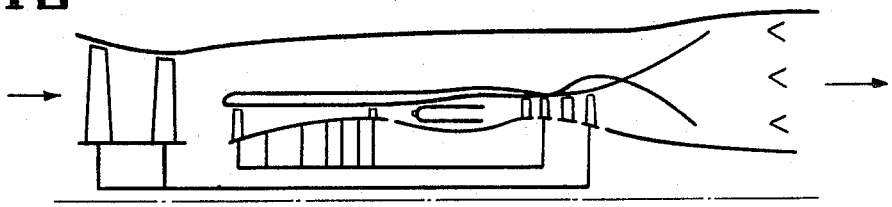
Figure 1C:
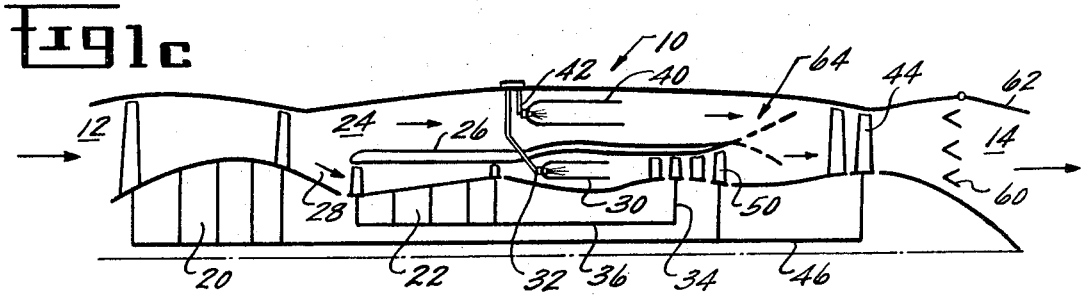

Turning now to FIGS. 1a–1c, FIG. 1c only will be discussed in detail since it illustrates the invention and the machines of FIGS. 1a and 1b are well known to those skilled in the art, the nomenclature being generally the same. FIG. 1c discloses a turbomachine useful as an aircraft gas turbine engine which has characteristics of a turbofan at low flight speeds and characteristics of a turbojet at high flight speeds. In the drawing, numeral 10 indicates an outer duct having an inlet end 12 and an outlet end 14. Located in the inlet end is a forward, or low-pressure compressor 20 of axial-flow, multistage design. Just aft of this first compressor is located a second, or high pressure axial-flow multistage compressor 22. While this well known type of compressor has been shown for purposes of illustration it will be understood that other types of compressors, e.g., centrifugal, may also be utilized. A portion of the flow from the first compressor will enter the annular space 24 formed by the outer duct 10 and a second, smaller duct 26 located concentrically within the former and surrounding the second, or inner compressor. The remainder of the flow from the first compressor enters the area 28 where it will be drawn into the second compressor. In the inner duct and downstream of the second compressor is located a first combustion means 30, including fuel injecting means 32 for supplying fuel to the duct for supporting combustion therein. In series flow relation with the first combustion means 30 is a first, or high pressure power turbine 34. The first power turbine is connected by a shaft 36 to the second compressor and supplies the energy needed to drive the second compressor.

Located downstream of area 24, in the outer duct, is a second combustion means 40, also including fuel injecting means 42 for supplying fuel to the outer duct to support combustion therein. In series flow relation with this second combustion means is a second, or low pressure power turbine 44. This second power turbine, which may also be termed the "duct" turbine since it projects into what is conventionally known as a bypass duct, is connected to the low pressure compressor by means of a shaft 46 and furnishes energy to drive the first compressor.

A primary feature of the present invention concerns the provision of an additional power or transfer turbine 50. The power or transfer turbine is connected to the shaft 46 and rotates with the low pressure turbine and compressor. It is understood that any or all of the turbines 34, 44, and 50, respectively, may consist of more than one stage, although one turbine wheel only is shown in the illustration.

At Mach 3.0, and above, operation may be likened to that of the conventional turbojet shown in FIG. 1a. Thus, air is taken into the forward compressor 20 and compressed. It is then heated in the outer duct combustion means 40, expanded through the power turbine 44 and ejected to provide thrust. If desired, reheat or "afterburner" combustion means 60 may be provided, for added thrust, along with a variable area jet exhaust nozzle 62. In the case where the inner duct combustion means 30 is inoperative, the inner "spool," i.e., the interconnected high-pressure compressor 22, shaft 36 and power turbine 34 will windmill, taking in an insignificant amount of air for ventilation purposes.

At transonic flight speeds and speeds below Mach 1.0, however, the operation may be described as that of a turbofan, modified by the addition of an inner "spool" which provides added flexibility of operation at off-design points. Assume, a low power or thrust requirement. With the outer combustion means 40 inoperative all combustion takes place at the relatively higher pressure ratio of the inner combustion system or gas generator. With power so reduced, the pressure ratio of the "fan," or forward compressor 20 is also reduced, which raises the corrected speed $n/\sqrt{\theta}$ $n$ = engine speed in rpm
$\theta$ = relative absolute temperature of of the inner "spool," and its pressure ratio, so that the overall propulsion cycle pressure ratio tends to remain constant.

Additionally, with use of the power transfer turbine 50 when operating as a "turbojet" with burning taking place in the inner duct combustor 30 and at lower power (thrust) requirements, the work of the duct (fan) power turbine 44 can be augmented since some power is derived from the power transfer turbine. This has an effect which may be described as increasing the duct turbine "efficiency" to a value greater than 1, i.e., less pressure is lost (more energy is available) than would be true if the outer burner only were operative at this lower thrust mode of operation. Part of the increased efficiency is due to the power transfer turbine taking out energy to help drive the low pressure compressor 20 before the gases in the inner duct are subject to mixing with the airflow in the outer duct.

On the other hand, when operating at higher power (thrust) modes the provision of the inner gas generator in combination with the power transfer turbine, makes possible an increase in the power, or energy, available from the "main" or duct turbine since both turbines help drive the low pressure compressor. Additionally, operation at high thrust modes with the outer combustor operative has the effect of reheating the air between the power transfer turbine 50 and the duct turbine 44. With the described arrangement it is therefore possible to have a situation wherein the pressure in the tail or exhaust end of the duct 10 tends to approach the high value available with a high pressure ratio turbojet, while the tail end temperature can approach the high value available with a low pressure ratio turbojet. Thus, the composite cycle of the present invention allows "turboject" operation from very high to very low thrust values while greatly reducing the variation in overall cycle pressure ratio. This results in higher efficiency of operation with a consequent better SFC. In addition, as shown in dotted lines in FIG. 1c, a mixing section indicated generally at 64 may be provided to facilitate the mixing of the gases in the event operation is such that the outer duct combustion means is turned off and only the inner gas generator is operative.

Figure 2:
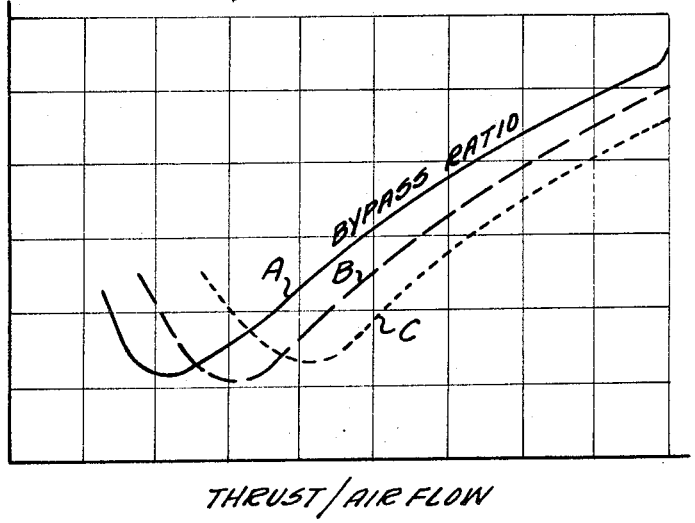
FIG. 2 is a graph showing factors optimizing performance of my novel composite cycle turbomachine as a "turbofan," i.e., at relatively low thrust operation.
Figure 3:
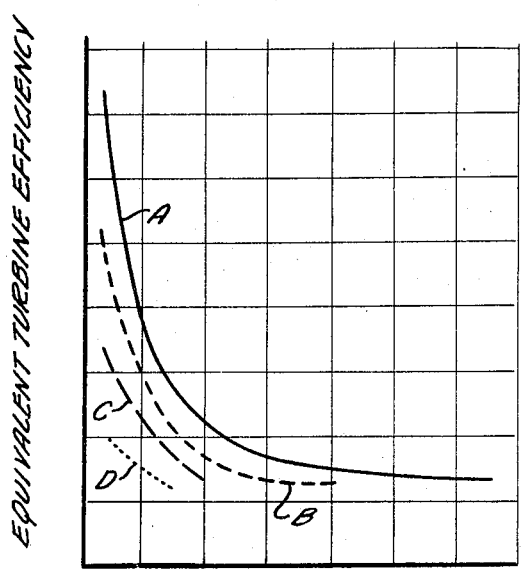
FIG. 3 is a graph showing factors optimizing performance of my novel composite cycle turbomachine as a "turbojet," i.e., at relatively high thrust operation.

The characteristics of the composite cycle of my invention may perhaps be more clearly understood if we examine the effect of component arrangement on "turbofan" characteristics, at low thrust settings, and on "turbojet" characteristics at high thrust settings. Reference should be made to FIGS. 2 and 3 wherein graphs are presented which show — independently — some of the factors involved in optimizing performance of the composite turbomachine at either high or low thrust requirements.

The curves in FIG. 2 illustrate the composite cycle characteristics at slightly less than Mach 1.0 in terms of SFC for values of corrected engine thrust (gross thrust, in pounds, per unit airflow) at several values of bypass ratio (the ratio of the weight of airflow in the bypass duct to that of the primary — inner — airflow). Curve A indicates a relatively high bypass ratio while curve C indicates a relatively low bypass ratio. The left portion of each curve typifies operation with the outer combustion means inoperative and the right portion shows performance with the outer combustion means operative. It will be noted that at the higher thrust values, with a lower bypass ratio, better SFC (efficiency) is possible with the composite cycle turbomachine of the present invention, since the transfer turbine is furnishing more of the energy needed to drive the low pressure compressor, or "fan." Thus, the fact that the power transfer turbine makes available more energy for the low pressure ratio cycle, or "turbofan" operation, enables the composite turbomachine to have a better SFC than would be possible with a conventional machine. It will also be noted that at lower thrust levels of operation the curves A, B, and C cross on the graph, indicating that the effect of bypass ratio is reversed and a higher bypass ratio, with its correspondingly lower inlet temperature into the duct turbine, will be more efficient. The cruise level of thrust for any particular flight mission will therefore be largely determinative of the bypass ratio adopted. It should be pointed out that the composite cycle machine provides a nearly constant bypass ratio at varying flight speeds, once the ratio is adopted for the desired cruise level, which has the further advantage of increasing the composite cycle machine's overall efficiency.

Referring now to FIG. 3, wherein the composite cycle is illustrated in terms of its "turbojet" characteristics, it should be noted that the primary purpose of the inner "spool" or gas generator is to furnish power to the "turbojet" We can perhaps best show its value to the composite cycle by pointing out that the energy which it furnishes need not be furnished by the duct turbine. Thus, if we include the work furnished to the cycle by the power transfer turbine, the duct turbine "efficiency" can be shown as an equivalent turbine efficiency. In other words, defining "turbine efficiency" to mean delivered compressor work divided by ideal turbine work, the addition of the work furnished by the power transfer turbine can make the equivalent efficiency of the duct turbine greater than 1. This is shown by the curves in the graph in FIG. 3 for varying pressure ratios of the forward compressor 20. Curve A indicates a relatively low pressure ratio and curve D a higher pressure ratio. It will be noted that, since at the lower forward compressor pressure ratios in the composite turbomachine more of the work is furnished by the power transfer turbine, the equivalent turbine efficiency can be quite high. At higher pressure ratios, of course, the second compressor inlet temperature will reach such values that less work per pound of airflow is available from the inner or high pressure ratio compressor and, additionally, the work requirement for the forward or low pressure ratio compressor rises. These conditions combine to militate against the inner gas generator adding to the duct turbine efficiency.

Finally, it should be noted that even when the forward compressor discharge temperature is high, either as a result of high pressure ratio or high thrust requirements (flight speeds), and work available from the power transfer turbine decreases, the overall efficiency of the composite cycle turbomachine of the present invention will not suffer since at such high flight speeds the cycle is substantially independent of the work capability of the inner gas generator.

Figure 4:
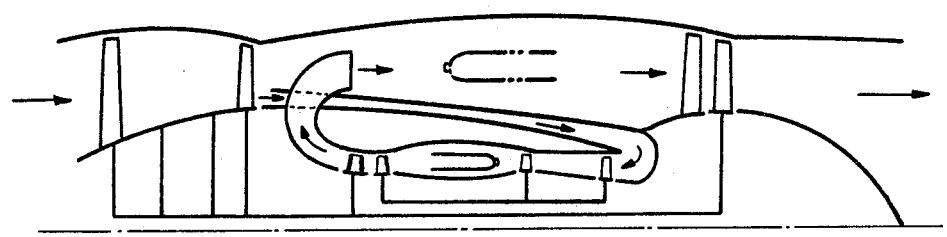
FIGS. 4–5 illustrate alternate arrangements of turbomachine components utilizing the composite propulsion cycle of the present invention.
Figure 5:
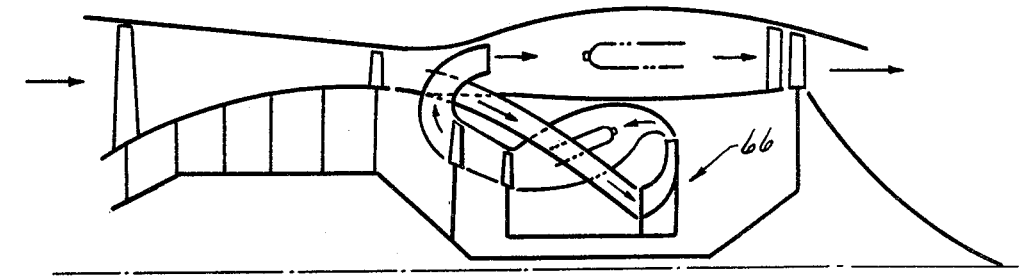

FIGS. 4-5 illustrate alternative arrangements of turbomachinery components wherein the machines utilize the composite cycle of the present invention. While all the embodiments disclosed herein may be termed mixed flow cycles, wherein the air that is discharged by the low pressure or forward compressor is drawn off by an inner duct and conveyed to the inlet of a high pressure compressor in the embodiments of FIGS. 4 and 5 a more compact machine is provided by the direction of flow, as indicated by the arrows in the drawings, being reversed. From the high pressure compressor the air passes through combustion means, from whence the resultant high pressure, high temperature gas is directed to a power turbine (which drives the high pressure compressor) and then to a power transfer turbine. The gases effluent from the power transfer turbine then mix with that portion of the low pressure compressor discharge which was not drawn in by the inner duct and in a substantially mixed condition these gases pass through an outer duct, a second combustor (which may or may not supply any heat to the cycle, depending on the operation mode), and from there through a main power (duct) turbine which furnishes that portion of the energy needed to drive the forward compressor which is not furnished by the power transfer turbine. A significant difference between the embodiments of FIGS. 4 and 5 is that in the latter configuration a centrifugal, rather than an axial-flow, compressor, indicated at 66, is utilized in the inner "spool" to offset the short blade lengths of the inner compressor and to take advantage of the fact that the flow is turned, in any event, in these embodiments. An advantage of the reversed flow embodiments of the present invention is that a shorter length machine is possible, which can be important in aircraft applications.

It will be understood, however, that in all such embodiments the use of the composite cycle enhances the machine's overall efficiency. Thus, while various embodiments have been shown and described herein this should not be taken as a limitation of the invention and obviously other turbomachinery arrangements will suggest themselves to those skilled in the art in which my composite cycle will be of equal value.

What I desire to claim and secure by Letters Patent is:

1. A composite fluid flow turbomachine comprising:
a first compressor;
a second compressor, said second compressor being arranged to continuously receive a part only of the flow from said first compressor,
an inner duct surrounding said second compressor;
an outer duct surrounding said first compressor and said inner duct;
means for injecting fuel within said outer duct and said inner duct for supporting combustion therein downstream of said first compressor and said second compressor, respectively;
a first power turbine located in said inner duct and receiving an integral fluid flow stream from said first and second compressors;
a second power turbine located partially in said outer duct, said second power turbine receiving a fluid flow stream from said first compressor and the integral fluid flow stream from said first and second compressors;
an outer driveshaft, said first power turbine and said second compressor being mounted on said outer driveshaft for rotation therewith;
an inner driveshaft concentric to said outer driveshaft, said second power turbine and said first compressor being mounted on said inner driveshaft for rotation therewith;
and a power transfer turbine, said power transfer turbine being arranged in series flow relation with said first and second power turbines, said power transfer turbine being mounted on said inner driveshaft and furnishing power to help drive said first compressor, whereby the overall cycle efficiency of said composite fluid flow turbomachine is increased.

2. A composite fluid flow turbomachine comprising:
a first compressor;
a second compressor, said second compressor being arranged to continuously receive a part only of the flow from said first compressor;
an inner duct surrounding said second compressor;
an outer duct surrounding said first compressor and said inner duct;
means for injecting fuel within said outer duct and said inner duct for supporting combustion therein downstream of said first compressor and said second compressor, respectively;
a first power turbine located in said inner duct and receiving an integral fluid flow stream from said first and second compressors;
a second power turbine located partially in said outer duct, said second power turbine receiving a fluid flow stream from said first compressor and the integral flow stream from said first and second compressors;
an outer driveshaft, said first power turbine and said second compressor being mounted on said outer driveshaft for rotation therewith;
an inner driveshaft concentric to said outer driveshaft, said second power turbine and said first compressor being mounted on said inner driveshaft for rotation therewith mechanically free from the rotation of said outer driveshaft;
and a power transfer turbine, said power transfer turbine being located in said inner duct downstream of said first power turbine, said power transfer turbine being mounted on said inner driveshaft for rotation with said first compressor and said second power turbine and furnishing power to help drive said first compressor, whereby the overall cycle efficiency of said composite fluid flow turbomachine is increased.

3. A composite fluid flow turbomachine comprising:
a first compressor;
a second compressor, said second compressor being arranged to continuously receive a part only of the flow from said first compressor;
an inner duct surrounding said second compressor;
an outer duct surrounding said first compressor and said inner duct;
means for injecting fuel in said outer duct and said inner duct for supporting combustion therein downstream of said first compressor and said second compressor, respectively;
a first power turbine located in said inner duct and receiving fluid flow from said first and second compressors;
a second power turbine located downstream of said first power turbine, said second power turbine extending transversely of both of said ducts for receiving fluid flow from said first compressor through said outer duct and said first and second compressors through said inner duct;
and a power turbine, said power transfer turbine being located in said inner duct downstream of said first power turbine, said power transfer turbine rotating with said first compressor and said second power turbine, the fluid effluent from said power transfer turbine mixing with the flow from said first compressor and furnishing power to help drive said first compressor, whereby the overall cycle efficiency of said composite fluid flow turbomachine is increased.

4. A composite fluid flow turbomachine comprising:
a first compressor;
a second compressor, said second compressor being arranged to continuously receive a part only of the flow from said first compressor;
an inner duct surrounding said second compressor;
an outer duct surrounding said first compressor and said inner duct;
means for injecting fuel in said outer duct and said inner duct for supporting combustion therein downstream of said first compressor and said second compressor, respectively;
a first power turbine located in said inner duct and receiving flow from said first and second compressors;
A second power turbine located downstream of said first power turbine, said second power turbine extending transversely of both of said ducts for receiving flow from said first compressor through said outer duct and said first and second compressors through said inner duct;

an outer driveshaft, said first power turbine and said second compressor being mounted on said outer driveshaft for rotation therewith;

an inner driveshaft concentric to said outer driveshaft, said second power turbine and said first compressor being mounted on said inner driveshaft for rotation therewith;

and a power transfer turbine, said power transfer turbine being located in said inner duct downstream of said first power turbine, said power transfer turbine being mounted on said inner driveshaft for rotation with said first compressor and said second power turbine, the fluid effluent from said power transfer turbine mixing with the flow from said first compressor downstream of said fuel injection means in said outer duct and furnishing power to help drive said first compressor, whereby the overall cycle efficiency of said composite fluid flow turbomachine is increased.

5. A composite fluid flow turbomachine comprising:

a first compressor;

a second compressor, said second compressor being arranged to continuously receive a part only of the flow from said first compressor;

first and second duct means, said first duct means surrounding said first and second compressors and said second duct means;

means for injecting fuel in said first and second duct means for supporting combustion therein;

a first power turbine receiving flow from said second compressor and furnishing driving energy thereto;

a second power turbine receiving flow from said first compressor and furnishing driving energy thereto;

and a power transfer turbine, said power transfer turbine being located intermediate said first and second power turbines and receiving the flow from said first and second compressors through said second duct means, the fluid flow into said first power turbine and said power transfer turbine being opposite in direction to the flow through said first compressor, and the fluid effluent from said power transfer turbine being turned 180° and mixing with the flow from said first compressor upstream of said fuel injection means in said outer duct and furnishing power to help drive said first compressor, whereby the overall cycle efficiency of said composite fluid flow turbomachine is increased.

6. A composite fluid flow turbomachine comprising:

a first compressor;

a second compressor, said second compressor being arranged to continuously receive a part only of the flow from said first compressor;

an inner duct surrounding said second compressor;

an outer duct surrounding said first compressor and said inner duct;

means for injecting fuel in said outer duct and said inner duct for supporting combustion therein downstream of said first compressor and said second compressor, respectively;

a first power turbine located in said inner duct and receiving an integral fluid flow stream from said first and second compressors;

a second power turbine located in said outer duct and receiving a fluid flow stream from said first compressor and the integral flow stream from said first and second compressors;

an outer driveshaft, said first power turbine and said second compressor being mounted on said outer driveshaft for rotation therewith;

an inner driveshaft concentric to said outer driveshaft, said second power turbine and said first compressor being mounted on said inner driveshaft for rotation therewith mechanically free from the rotation of said outer driveshaft;

and a power transfer turbine, said power transfer turbine being located in said inner duct downstream of said first power turbine, said power transfer turbine being mounted on said inner driveshaft for rotation with said first compressor and said second power turbine, the fluid flow into said first power turbine and said power transfer turbine being opposite in direction to the flow through said first compressor, and the fluid effluent from said power transfer turbine being turned 180° and mixing with the flow from said first compressor upstream of said fuel injection means in said outer duct and furnishing power to help drive said first compressor, whereby the overall cycle efficiency of said composite fluid flow turbomachine is increased.

7. The invention as claimed in claim 6 wherein at least one of said first and second compressors is of the centrifugal-flow type.

* * * * *